Feb. 26, 1963 R. LEVISON ETAL 3,078,513
APPARATUS FOR EXTRUDING THERMOPLASTIC MATERIAL
Original Filed Dec. 15, 1958 2 Sheets-Sheet 1

INVENTOR
Robert Levison and
Jan Lodewijk Voigt
BY Stevens, Davis, Miller and Mosher
ATTORNEYS

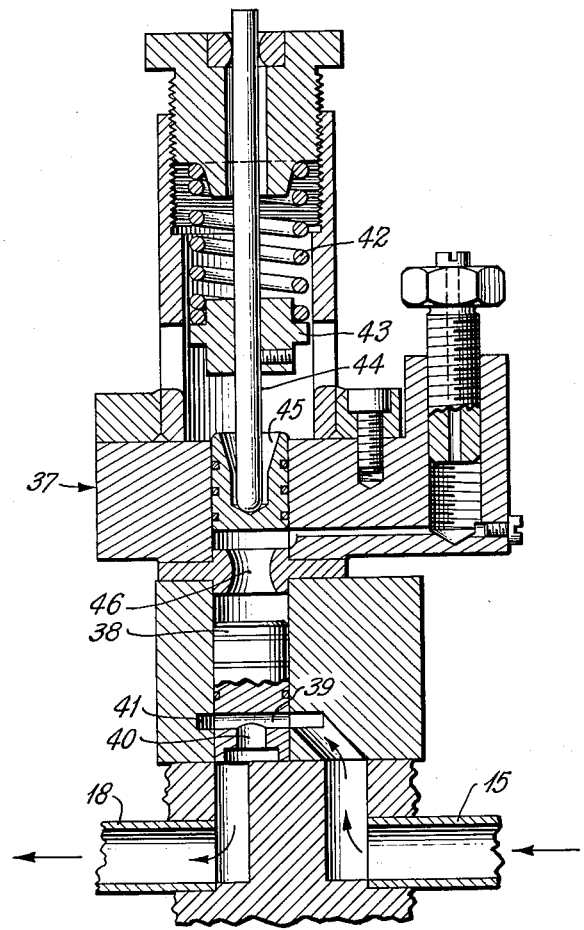

United States Patent Office 3,078,513
Patented Feb. 26, 1963

3,078,513
APPARATUS FOR EXTRUDING THERMOPLASTIC MATERIAL
Robert Levison and Jan Lodewijk Voigt, Arnhem, Netherlands, assignors to N.V. Onderzoekingsinstitut Research, Arnhem, Netherlands, a corporation of the Netherlands
Application Dec. 15, 1958, Ser. No. 780,499, which is a continuation of application Ser. No. 478,816, Dec. 30, 1954. Divided and this application Jan. 11, 1961, Ser. No. 94,661
Claims priority, application Netherlands Dec. 31, 1953
1 Claim. (Cl. 18—12)

This invention relates to a new and improved pressure-regulating or pressure-limiting device. It is particularly useful in connection with the continuous manufacture of bars, profiles, tubes and the like elongated articles from artificial thermoplastic substances and will therefore be described in detail in connection with such manufacture, although it is to be understood that it is of more general application and is not restricted to such a use. This application is a division of our prior copending U.S. application Serial No. 780,499, filed December 15, 1958, and now abandoned, which in turn is a continuation of application in the nature of a division of our prior copending U.S. application Serial No. 478,816, filed December 30, 1954, now U.S. Patent No. 2,867,004

In the usual process for the continuous manufacture of bars from artificial thermoplastic substances in which the thermoplastic substances have a narrow melting range and in which the transition from the completely liquid state into the solid state occurs in a temperature range of a few degrees, as is the case of superpolyamides and polyesters (polymethylene terephthalate), for instance in the range of less than 20 centigrade degrees, considerable difficulties are met in that the material sticks in the mold and the articles show varying shapes or their surface is not smooth. Also interior cavities may form. With substances such as cellulose acetate in which there occurs a general softening over a very wide temperature range, these difficulties are not encountered.

To overcome this difficulty it has already been suggested to force lubricants under high pressure into the molding device so that a film of lubricant is produced between the walls of the molding device and the molten thermoplastic material. In this way the difficulties are avoided for the greater part; however, such a system also has its disadvantages in that it is difficult to control the dosage of lubricants used.

It has been found that the difficulties with regard to thermoplastic substances having a narrow melting range can be quite readily eliminated if the supply of molten thermoplastic substance passing to the molding device is retained under a regulated pressure and at a regulated temperature while maintaining a maximum temperature gradient within the melting range (i.e., shock cooling) as the molten substance enters the molding device. That process has been described and claimed in our aforesaid copending application.

It is an object of the present invention to provide as part of an arrangement especially useful for molding thermoplastic substances wherein the temperature and pressure are so regulated that a maximum temperature gradient within the melting range is maintained as the molten substance enters the molding device, a pressure-regulating or pressure-limiting device having a new and improved structure and arrangement.

A further object of the invention is to provide a new and improved pressure-limiting device of general utility.

According to the process described and claimed in our aforesaid copending application, the molten thermoplastic substance is guided, prior to entering the molding device, through a space surrounded by a heat-insulating material.

The pressure regulation is effected by means of an overflow device arranged in the duct through which the molten thermoplastic material passes, this overflow becoming operative at a predetermined pressure, or by a reduction valve provided in the duct to which the molten material passes. The reduction valve is suitable for operation at the temperatures and the pressure used. The temperature regulation is preferably effected by a tempering device provided in the duct through which the material passes. While the desired pressure regulation can be achieved in any one of many ways, one especially desirable way is by use of the pressure-limiting device described hereinafter.

A more detailed description of the pressure-limiting device of the present invention will now be given in connection with a description of the process and apparatus illustrated in the accompanying drawings.

In the drawings, similar reference numerals indicate like parts throughout the several views, wherein:

FIGURE 3 is a cross-sectional elevation view of the pressure-limiting device according to the present invention.

Figure 1:
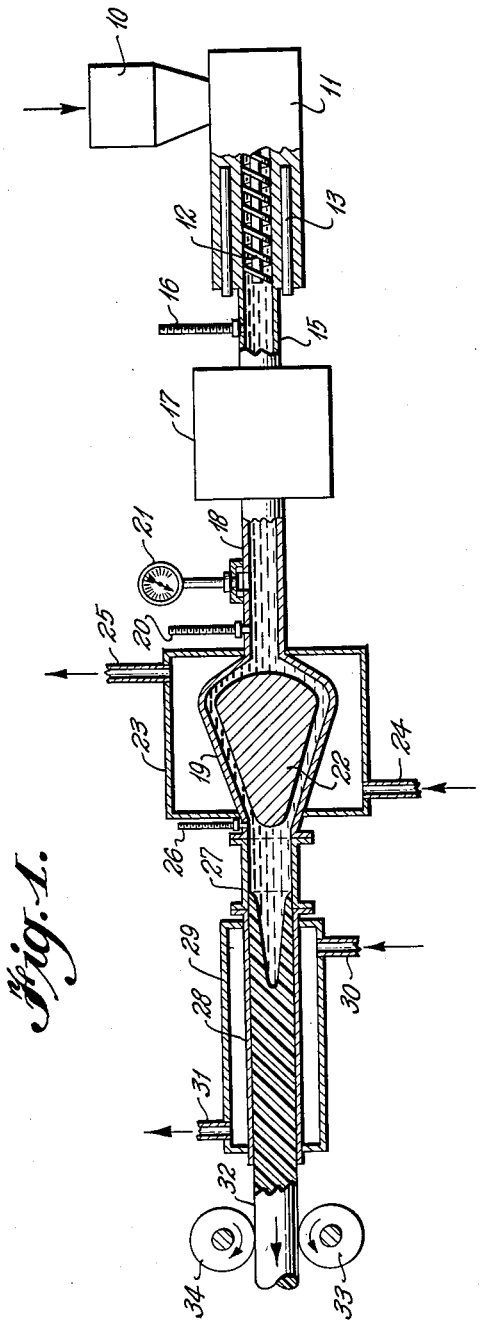
FIGURE 1 is a cross-sectional elevation view of an apparatus useful in carrying out the process of our aforesaid copending application.

Referring now to the drawings and more particularly to FIGURE 1, reference numeral 10 denotes a hopper for introducing the granular plastic material into the apparatus. Communicating with the discharge end of the hopper 10 is an extrusion device 11 through which the granular plastic material is forced by means of a worm screw 12 positioned centrally and extending longitudinally of device 11. Positioned within the extrusion device 11 and surrounding the worm screw 12 in heat conductive relationship therewith is a heating means 13. The heating means may be composed of any known type of heating element which will raise the temperature in the extrusion device sufficiently high to melt the granular plastic material. Communicating with the extrusion device is a conduit 15 through which the molten plastic material passes upon leaving the extrusion device. In contact with the conduit 15 is a thermometer 16 which registers the surface temperature of the conduit. From the conduit 15 the now molten plastic material passes to a pressure-regulating or pressure-limiting device indicated broadly at 17 and described more fully hereinafter. From this device 17 the material passes through a conduit 18 into a tempering device 19. Attached to the conduit 18 are a thermometer 20 and pressure gauge 21 for indicating, respectively, the temperature and pressure of the molten material passing through conduit 18. The molten material in passing into the tempering device 19 contacts a torpedo 22 which because of its shape causes the material in passing therearound to take the shape of a relatively thin film. Surrounding the tempering device is a housing 23 through which a temperature regulating fluid may enter at 24 and leave at 25. The temperature regulation achieved by means of the housing and torpedo, in combination, results in very accurate and uniform heating of the molten plastic material prior to its entry into the molding device. Attached to the exit end of the tempering device 19 is a thermometer 26 for indicating the temperature of the molten material as it leaves the tempering device. Communicating with the exit end of the tempering device is a conduit 27 made of a heat-insulating material which will allow for the greatest range in temperature drop within the melting range when the molten mass passes from the molten state to the solid state. The heat-insulating material may be for instance glass, polytetrafluoroethylene, or an asbestos product. It is preferred to use an asbestos product for this conduit. It is also preferable that the conduit have the same internal cross-section as the molding device since this allows for easier flow of material through the apparatus. Communicating with the conduit 27 is a molding device 28 which in the drawing is shown as a tube, although it is contemplated that the molding device may be of various shapes. The molding device is cooled by means of a jacket 29 through which a cooling liquid flows in and out by means of inlet 30 and outlet 31. The solidified bar 32, which is drawn out of the molding device 28 by means of rollers 33 and 34, has a slightly lesser diameter than the diameter of the molding device due to solidification shrinkage.

The effect of the heat-insulating conduit 27 is that at the location where molten material solidifies in the conduit 27 no gradual temperature transition occurs, and hence in the region of the first solidification no extremely thin film of solid material is formed which film would be pressed against the wall by the molten material. On the contrary, as shown in FIGURE 1, a relatively thick coat is formed at the place of the first solidification (solidified material in the connecting conduit 27 and the molding device 28 is shown by diagonal hatching in FIGURE 1) this coat moving along in the molding device while gradually increasing in thickness. If the pressure is not too high this thick layer prevents the solidified material from adhering to the wall regardless of its rate of feed. At high pressures the solidified mass moves along with jolts and no uniform product is formed. When the pressure is too low the molds are not sufficiently filled and flaws occur.

When bars are made from Nylon 6 (from epsilon-caprolactam) the temperature at thermometer 16 is in general 260° C., this temperature being considerably higher, in connection with a smooth operation of the pressure regulating device 17, than required for obtaining a liquid material suitable for molding. At thermometer 20 the temperature is about 225° C. and at the thermometer 26 the temperature is about 230° C. The pressure before the tempering device 19, adjusted by means of the pressure-regulating or pressure-limiting device 17, depends on the thickness of the bar to be manufactured. The following table shows the pressure conditions for bars of various sizes:

| Diameter of bar, mm. | Pressure, atm. |
| --- | --- |
| 6 | 8 |
| 6 | 12 |
| 9 | 15 |
| 12 | 16–20 |

The cooling water in the cooling jacket 29 is generally kept at about 10° C. and the temperature of the bar 32 emerging from the molding device 28 is in general about 60° C.

Favorable results are also obtained in the production of bars from other thermoplastic materials having a narrow melting range.

Figure 2:
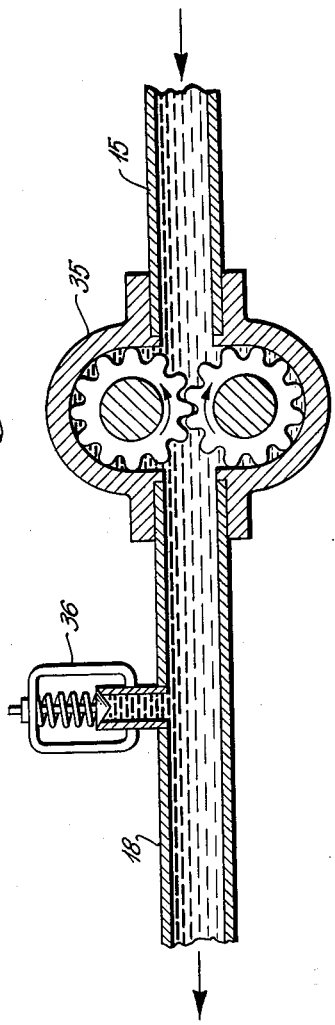
FIGURE 2 is a cross-sectional view of one embodiment of pressure regulating means useful in carrying out the aforesaid process but not forming part of the present invention.

Referring now to the pressure-regulating or pressure-limiting device 17 and more particularly to the embodiment thereof shown in FIGURE 2, molten material passing through conduit 15 enters gear pump 35 which is provided with a subsequent overflow valve 36. The output of the gear pump 35 is so adjusted that the pressure on the downstream side of the gear pump is always somewhat higher than the pressure at which the overflow valve 36 is adjusted and therefore a small amount of molten material always passes through the valve 36. The excess plastic material emerging from the overflow valve 36 may be worked up again into grains or may be fed back to the conveyor screw 12.

Referring now to FIGURE 3 which illustrates the pressure-limiting device of the present invention, this comprises a liquid reduction valve 37 which is especially suitable for the pressures and temperatures at which the operation described herein for purposes of illustration takes place. When such a pressure-limiting valve is used at 17 in the system of FIGURE 1 no overflow is required and the necessity of feeding back or remelting the plastic material is therefore avoided. In the reduction valve 37 a piston 38 is disposed which is provided with a cross bore 39 having in communication therewith a bore 40 in the longitudinal axis of the piston 38. The cross bore 39 communicates with a ring-shaped bore 41 in the body of the valve 37. This ring-shaped bore 41 also communicates directly with duct 15 and indirectly (via cross bore 39 and bore 40) with duct 18 when the piston 38 is in or near its lowermost position so that the molten plastic material may flow into the valve through duct 15 and out of the valve through duct 18. Valve 37 is so adjusted that as soon as the pressure in duct 18 becomes too high, the piston 38 moves upwardly and consequently the ring-shaped bore 41 is entirely or at least partly closed by the piston 38. The pressure at which the piston moves upwardly is regulated by means of a spring 42 contacting a ring 43 which in turn is connected to a pin 44. Pin 44 regulates the position of an auxiliary piston 45. The movement of the piston 38 is transmitted to the auxiliary piston 45 by means of a heat-resisting grease in the space at 46 between the two pistons. Such a heat resistant grease may consist for instance of organic polysiloxanes.

What is claimed is:

In an apparatus for extruding thermoplastic including means for melting thermoplastic, means for extruding molten thermoplastic, means for maintaining the temperature of such molten thermoplastic within narrow limits, and forming means for forming plastic articles from said molten thermoplastic, the improvement comprising means for limiting the pressure of such molten thermoplastic at the entrance to said forming means within prescribed limits wherein said pressure limiting means includes a valve body having a cavity therein, a fluid inlet to said cavity and a fluid outlet therefrom, valve means within said cavity for interconnecting said inlet and said outlet, said valve means being movable from a position establishing maximum flow of fluid to a fluid cut-off position, said valve means presenting a pressure responsive surface to said fluid, the pressure of the fluid which is being controlled acting to bias said valve means toward its fluid cut-off position, means resiliently biasing said valve means towards said position of maximum fluid flow, a chamber intermediate said valve means and said resilient biasing means, an incompressible fluid in said chamber for transmitting thrust between said valve means and said resilient biasing means, an intermediate plate of substantial thickness separating the entire portion of the pressure limiting means which includes said valve means from the entire portion of the pressure limiting means which includes said resilient biasing means.

References Cited in the file of this patent
UNITED STATES PATENTS

| 242,105 | Boshop | May 31, 1881 |
| 1,069,188 | Saefke | Aug. 5, 1913 |
| 2,686,935 | Stott | Aug. 24, 1954 |
| 2,736,057 | Davis | Feb. 28, 1956 |
| 2,747,222 | Koch | May 29, 1956 |
| 2,747,224 | Koch | May 29, 1956 |
| 2,802,237 | Davis | Aug. 13, 1957 |